US009397896B2

(12) United States Patent
Billore et al.

(10) Patent No.: US 9,397,896 B2
(45) Date of Patent: Jul. 19, 2016

(54) MODELING COMPUTER NETWORK TOPOLOGY BASED ON DYNAMIC USAGE RELATIONSHIPS

(71) Applicant: International Business Machines Corporation, Armonk, NY (US)

(72) Inventors: Ashish Billore, Bangalore (IN); Divya K. Konoor, Bangalore (IN); Nanjangud C. Narendra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 14/074,116

(22) Filed: Nov. 7, 2013

(65) Prior Publication Data

US 2015/0127807 A1    May 7, 2015

(51) Int. Cl.
*H04L 12/26* (2006.01)
*H04L 12/24* (2006.01)

(52) U.S. Cl.
CPC .............. *H04L 41/12* (2013.01); *H04L 41/145* (2013.01); *H04L 43/0882* (2013.01)

(58) Field of Classification Search
CPC .................................. G06F 7/00; G06F 17/33
USPC ........................................................ 709/224
See application file for complete search history.

(56) References Cited

U.S. PATENT DOCUMENTS

| | | | |
|---|---|---|---|
| 7,821,947 B2 | 10/2010 | MacCormick et al. | |
| 2002/0147764 A1 | 10/2002 | Krupczak | |
| 2005/0050158 A1 | 3/2005 | Solari | |
| 2008/0016115 A1 | 1/2008 | Bahl et al. | |
| 2008/0222287 A1 | 9/2008 | Bahl et al. | |
| 2010/0290603 A1 | 11/2010 | Gemayel et al. | |
| 2011/0131252 A1* | 6/2011 | Son | H04L 41/12 707/803 |
| 2013/0219057 A1* | 8/2013 | Li | G06F 8/443 709/224 |
| 2015/0127815 A1 | 5/2015 | Billore et al. | |

FOREIGN PATENT DOCUMENTS

CN              104639406 A      5/2015

OTHER PUBLICATIONS

Apte et al., "Look Who's Talking: Discovering Dependencies between Virtual Machines Using CPU Utilization" HotCloud'10, Proceedings of the 2nd USENIX conference on Hot topics in cloud computing, USENIX Association Berkeley, CA, USA © 2010, pp. 1-7, <http://static.usenix.org/event/hotcloud10/tech/full_papers/Apte.pdf>.
Bagchi et al., "Dependency Analysis in Distributed Systems using Fault Injection: Application to Problem Determination in an e-commerce Environment", O.Festor and A. Pras (Eds):12th International Workshop on Distributed Systems: Operations and Management DSOM'2001 Nancy France, Oct. 15-17, 2001, <http://proceedings.utwente.nl/14/1/S5-2.pdf>.

(Continued)

*Primary Examiner* — David Lazaro
*Assistant Examiner* — Zia Khurshid
(74) *Attorney, Agent, or Firm* — Stephen Yoder

(57) ABSTRACT

A method for modeling dependencies in a computing system including a plurality of resources, the method includes monitoring data communications made between the resources of the plurality of resources; modeling dependencies, at least among and between the resources, based, at least in part, upon the monitored data communications; and generating a set of topology graph(s), including at least a first topology graph, based upon the modeled dependencies.

16 Claims, 5 Drawing Sheets

(56) References Cited

OTHER PUBLICATIONS

Barham et al., "Automated discovery of service and host dependencies in networked systems", pp. 1-14, provided in search report dated Dec. 13, 2012, <http://research.microsoft.com/en-us/people/risaacs/constellationv1.pdf>.

Chiarini et al., "Dynamic Dependencies and Performance Improvement", pp. 9-21 of the Proceedings of the 22nd Large Installation System Administration Conference (LISA '08), (San Diego, CA: USENIX Association, Nov. 9-14, 2008), <http://static.usenix.org/event/lisa08/tech/full_papers/chiarini/chiarini_html/>.

Singh et al., "DYSWIS: An Architecture for Automated Diagnosis of Networks", Operations and Management Symposium, 2008, NOMS 2008, IEEE, pp. 851-854, <http://www1.cs.columbia.edu/~vs2140/DYSWIS.pdf>.

"Dependency graph", Wikipedia, the free encyclopedia, page last modified on Aug. 1, 2013 at 07:23, <http://en.wikipedia.org/wiki/Dependency_graph>.

"High availability", Wikipedia, the free encyclopedia, page last modified on Jul. 12, 2013 at 18:19, <http://en.wikipedia.org/w/index.php?title=High_availability&oldid=563998481>.

"Topology Perspective views", IBM Systems Director v6.3.x, dowloaded on Aug. 9, 2013, <pic.dhe.ibm.com/infocenter/director/pubs/index.jsp?topic=%2Fcom.ibm.director.console.helps.doc%2Ffqm0_c_rn_topology_perspective_views.html>.

"Transitive relation", Wikipedia, the free encyclopedia, page last modified on Mar. 12, 2013 at 20:43, <http://en.wikipedia.org/w/index.php?title=Transitive_relation&oldid=543691532>.

"Virtual machine", Wikipedia, the free encyclopedia, page last modified on Sep. 15, 2013 at 10:42, <http://en.wikipedia.org/w/index.php?title=Virtual_machine&oldid=573000719>.

\* cited by examiner

MODELING COMPUTER NETWORK TOPOLOGY BASED ON DYNAMIC USAGE RELATIONSHIPS

FIELD OF THE INVENTION

The present disclosure relates generally to the field of systems management, and more particularly to modeling dependencies in a networked system.

BACKGROUND OF THE INVENTION

It is known to model relationships among resources in a computer network. It is further known to model dependencies among resources with a view towards enabling failover in case a resource is inaccessible.

In the context of systems management, the existence of and inter-connections between different network resources is generally modeled using a resource relationships graph, also known as a topology graph, a topology map, or a dependency graph. Multiple topology perspectives could be derived for every resource of interest to the user. Each such topology perspective displays the primary resource of interest along with the other resources it is related to and the relationships that exists between them. For example, a network topology perspective displays the network connections that exist between a resource and the network elements to which it is connected. As a further example, a network topology virtualization perspective displays the network connections that exist between a resource and the virtual systems to which it is linked.

It is known to provide the user with different topology perspectives, where each different perspective displays a corresponding set of relationships applicable to an "endpoint."

SUMMARY

Embodiments of the invention relate to a system, a computer program product and a method for modeling dependencies in a computing system including a plurality of resources that includes: monitoring data communications made between the resources of the plurality of resources; modeling dependencies, at least among and between the resources, based, at least in part, upon the monitored data communications; and generating a set of topology graph(s), including at least a first topology graph, based upon the modeled dependencies.

DETAILED DESCRIPTION

Figure 1:
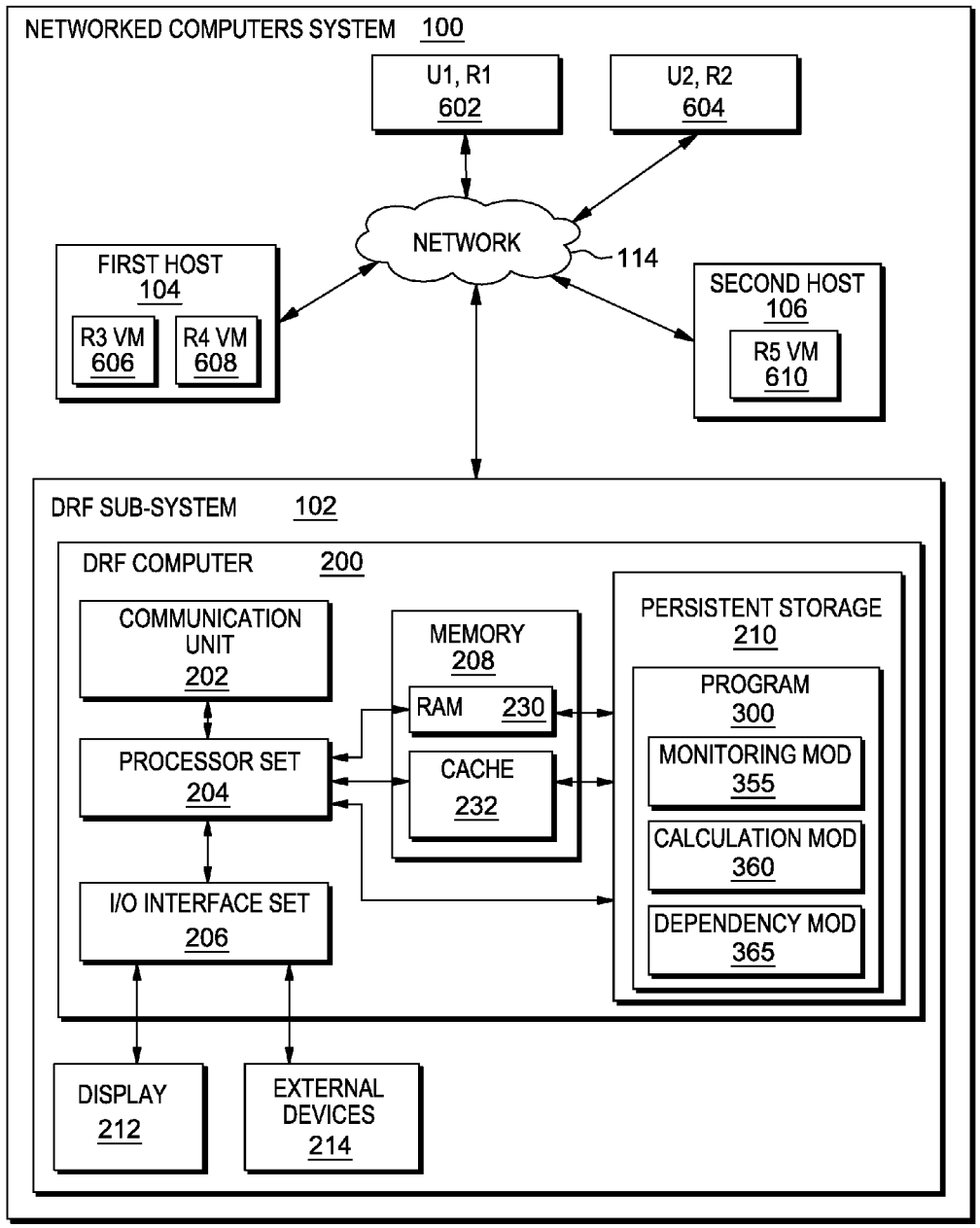
FIG. 1 is a schematic view of a first embodiment of a networked computers system (that is, a system including one or more processing devices) according to the present invention.

This Detailed Description section is divided into the following sub-sections: (i) The Hardware and Software Environment; (ii) First Embodiment; (iii) Further Comments and/or Embodiments; and (iv) Definitions.

I. THE HARDWARE AND SOFTWARE ENVIRONMENT

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of networked computers system 100, including: dynamic relationship factor (DRF) computer sub-system (that is, a portion of the larger computer system that itself includes a computer) 102; first host computer sub-system 104; R3 virtual machine sub-system (referred to as R3) 606; R4 virtual machine sub-system (referred to as R4) 608; second host computer sub-system 106; R5 virtual machine sub-system (referred to as R5) 610; R1 computer sub-system used by user U1 (referred to as U1,R1) 602; R2 computer sub-system used by user U2 (referred to as U2,R2) 604; communication network 114; DRF computer 200; communication unit 202; processor set 204; input/output (i/o) interface set 206; memory device 208; persistent storage device 210; display device 212; external device set 214; random access memory (RAM) devices 230; cache memory device 232; program 300; monitoring module 355; calculation module 360; and dependency module 365.

Server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, a tablet computer, a net book computer, a personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the First Embodiment sub-section of this Detailed Description section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110 and virtual machine 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with server computer 200. For example, I/O interface set 206 provides a connection to external device set 214. External device set 214 will typically include devices such as a keyboard, a keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. FIRST EMBODIMENT

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
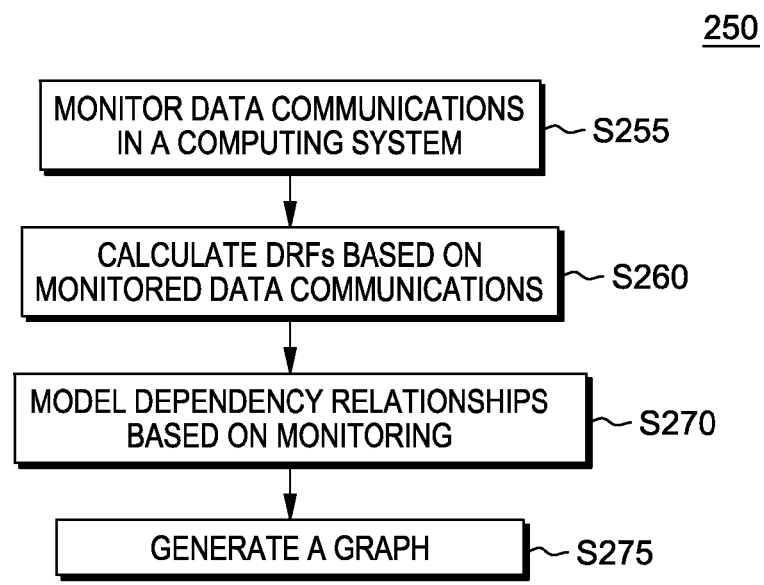
FIG. 2 is a first flowchart showing a process performed, at least in part, by the first embodiment computers system.

FIG. 2 shows a flow chart 250 depicting a method according to the present invention. FIG. 1 shows program 300 for performing at least some of the method steps of flow chart 250. This method and associated software will now be discussed, over the course of the following paragraphs, with extensive reference to FIG. 2 (for the method step blocks) and FIG. 1 (for the software blocks).

Figure 3A:
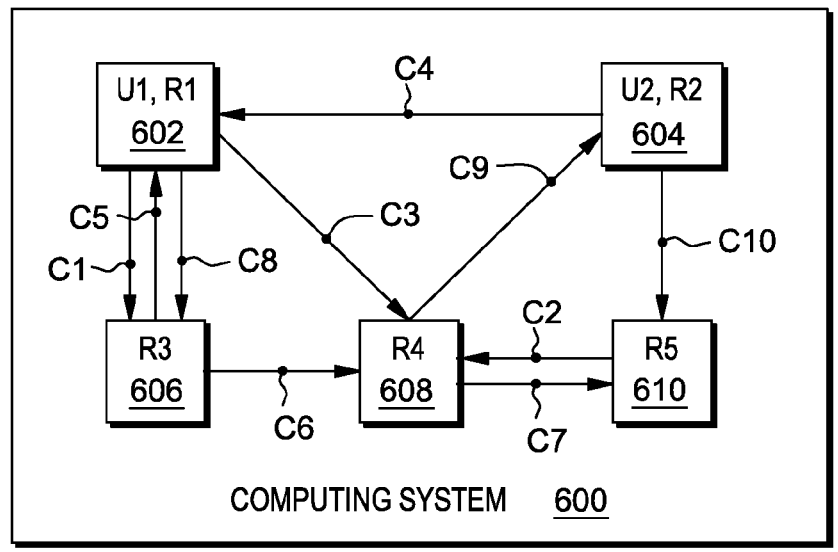
FIG. 3A is a schematic view of a portion of the first embodiment computers system.

Processing begins at step S255 where monitoring module ("mod") 355 monitors computing system 600 (see FIG. 3A) to detect data communications among and between its users and/or resources (which are: first user/resource 602, second user/resource 604, third resource 606, fourth resource 608, and fifth resource 610). As further shown in FIG. 3A, the data communications made during the monitoring period of step S255 are: C1, C2, C3, C4, C5, C6, C7, C8, C9 and C10. In this embodiment, the computer (DRF computer 200) and software (mod 355) actually performing this monitoring are not part of computing system 600, which is being monitored (although DRF computer 200 is in data communication with computing system 600 in order to allow the monitoring to take place). Alternatively, DRF computer 200 could be part of the computing system that it monitors and for which it models dependencies.

Processing proceeds to step S260, where calculation mod 360 calculates dynamic relationship factors ("DRFs") based on the monitored data communications of step S255. The monitored data communications (shown in FIG. 3A) and associated DRFs are shown in the following Table 1:

| PAIR | COMMU-NICATION | VOLUME | TIME | FRE-QUENCY | DRF1 | DRF2 |
|---|---|---|---|---|---|---|
| 602/604 | C4 | 100 | 7 | 1 | 14.3 | 14.3 |
| 602/606 | C1 | 100 | 11 | 3 | 9.1 | 327.0 |
| 602/606 | C5 | 200 | 6 | 3 | 33.3 | 327.0 |
| 602/606 | C8 | 200 | 3 | 3 | 66.7 | 327.0 |
| 602/608 | C3 | 100 | 8 | 1 | 12.5 | 12.5 |
| 604/608 | C9 | 100 | 2 | 1 | 50.0 | 50.0 |
| 604/610 | C10 | 100 | 1 | 1 | 100.0 | 100.0 |
| 606/608 | C6 | 100 | 5 | 1 | 20.0 | 20.0 |
| 608/610 | C2 | 500 | 9 | 2 | 55.6 | 361.0 |
| 608/610 | C7 | 500 | 4 | 2 | 125.0 | 361.0 |

Note:
pairs with no data communications between them are not listed here for brevity.

In Table 1: (i) the DRF1 values are based on data volume of each communication and how much time has passed since the communication was made (that is, the TIME column of Table 10); (ii) the DRF1 values are calculated for each communication by dividing volume by time; (iii) the DRF2 values are based on data volume of all communications for a pair, how much time has passed since various communication(s) between members of the pair, and communication frequency; and (iv) the DRF2 values are calculated for each by summing the DRF1 values for all communication(s) between the pair, and then multiplying by the number of communications between the pair. This particular method of calculating DRF values is not necessarily the best way to calculate DRF values according to the present invention, but is explained here to help readers understand how DRF values can be based on volume, frequency and time elapsed.

Processing proceeds to step S270, where dependency mod 365 models dependencies by determining that all pairs in system 600 that have a monitored data communication (see Table 1, above, where all listed pairs in system 600 do have at least one communication therebetween. Processing proceeds to step S275 where mod 365 goes on to generate a set of topology graphs (from various perspectives) and to display the same for an interested party through display device 212. One such network topology is shown at screenshot 650 of FIG. 3B.

Figure 3B:
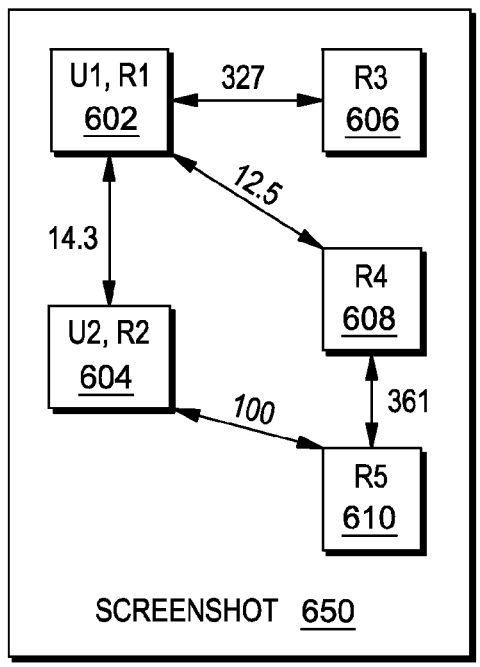
FIG. 3B is a screenshot generated by the first embodiment computers system.

FIG. 3B is screenshot 650 showing a topology graph of computing system 600 as displayed to the user according to one embodiment of the present disclosure. Alternatively, the topology graph is stored in a file, or otherwise made available for viewing and/or analysis. In screenshot 650, the user is displayed the DRF2 values from the perspective of U1,R1 602 for usage relationships according to communications between resource and/or user pairs within the computing system. The DRFs for data communications C6 and C9 are not shown because communications C6 and C9 are not seen from the U1,R1 perspective. In this embodiment, where a direct dependency is shown, any corresponding transitive dependencies are not shown. Alternatively, every transitive dependency is shown, despite there also being a direct dependency to the same node.

It should be noted that the transitive dependency between U1,R1 602 and R5 610 is shown in this topology graph. There are two dependency chains through which U1,R1 602 and R5 610 have a transitive dependency: (i) through R4, 608; and (ii) through U2,R2 604. Alternatively, transitive dependencies are not shown on the topology graph.

III. FURTHER COMMENTS AND/OR EMBODIMENTS

Some embodiments of the present invention address how to model dynamic dependency relationships, or dynamic usage relationships, among computer network resources and the users of those resources.

Some embodiments of the present invention provide a system and method to ensure that the dynamic real-time relationships among resources, as well as the users using the resources, are continuously maintained and updated to reflect changes to the resources. To achieve this, some embodiments calculate a dynamic relationship factor (DRF). Additionally, some embodiments of the present invention continuously update the DRF with current network resource availability. The DRF measures bonding among resources and users in a network including: (i) resource to resource bonding; (ii) user to resource bonding; and/or (iii) user to user bonding.

Some embodiments of the present invention model transitive dependencies among resources and users in a computer network. Transitive dependencies are those dependencies that extend beyond a first layer of dependencies. For example, node R1 is dependent on node R2, which is in turn dependent on R3. R1 is said to have a transitive dependency on R3.

Some embodiments of the present invention recognize that: (i) the static view of conventional network topologies do not represent the actual real time interaction relationships and hence dependency among the resources; (ii) there is a need for a model to represent these usage relationships and display them to the users on demand; and (iii) conventional network topologies do not provide dynamic usage resource relationships, for example, there is generally no way of determining those resources that execute processes jointly with the resource in question (mentioned above, discussed in more detail, below, as "transitive dependency").

Some embodiments of the present invention provide a method and apparatus for modeling computer network topology based on dynamic resource usage relationships. Usage relationships represent the true picture of how the network's resources are being used collectively. These usage relationships also provide valuable insight to network administrators to redesign the network. For example, usage relationships provide the necessary support for moving related resources into the same subnet or server pool.

Some embodiments of the present invention provide a system and method for: (i) calculating the degree, or measure, of bonding between systems in a cloud and/or computer network; (ii) modeling the resource usage relationship data; and (iii) displaying usage relationship data and the degree of bonding between systems in a cloud and/or computer network to reflect how systems interact with each other in real time. In this way, the real time degree of dependencies, or measure of bonding, among inter-connected resources and/or users is accurately known and is dynamically updated.

Figure 4:
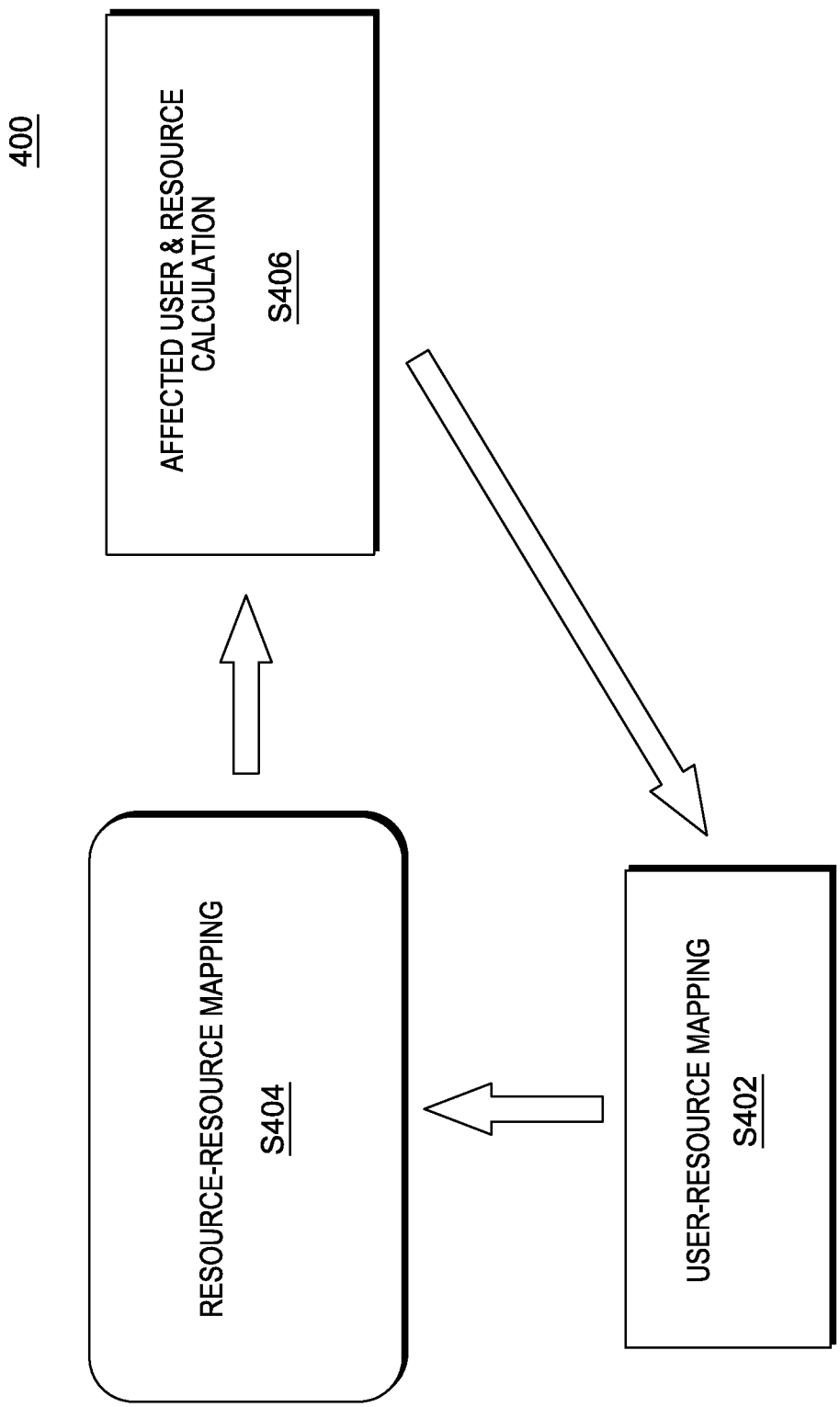
FIG. 4 is a second flowchart showing a process performed, at least in part, by the first embodiment computers system.

FIG. 4 is a flow chart of process 400 providing a method to ensure that the dynamic real time usage relationships among resources and/or users are continuously maintained and updated based on resource changes.

Processing begins at step S402, where the resources that are used by a user are determined.

Processing proceeds to step S404, where usage relationships among every pair of resources are modeled on a scale of 0-1, with the higher number denoting closer bonding between the resources. The value assigned to the usage relationship is derived by monitoring how frequently the pair of resources interacts (communicates and exchanges data) with each other in the network.

Processing proceeds to step S406, where the closest bonded resources and/or users within the cloud and/or computer network are determined based on resource to resource, user to resource, and user to user mappings.

The DRF measures the extent of bonding between a pair of resources and/or users. Resource to resource bonding varies in degree and includes: (i) a first resource, R1, needs a second resource, R2, in order to execute a program; (ii) a first resource, R1, would be affected if a second resource, R2, went down, but resource R2 is replaceable; (iii) a first resource, R1, would be affected if a second resource, R2, went down, but resource R2 is not replaceable (for example, R2 is a critical resource); and (iv) a second resource, R2, is a back-up, or mirror, for a first resource, R1, such that if resource R2 is down, the normal functioning of resource R1 is not affected; however, resource R1's HA (high availability) capability or scalability may be affected.

User to resource bonding arises when a first user, U1, needs to access a first resource, R1, as part of user U1's activities. Bonding between user U1 and resource R1 varies in degree and includes: (i) user U1 needs resource R1 in order to execute a program; (ii) user U1 would be affected if resource R1 went down, but resource R1 is replaceable; (iii) user U1 would be affected if resource R1 went down, but resource R1 is not replaceable (for example, R1 is a critical resource); and (iv) user U1 can perform the same function without resource R1, but with low performance or with risk of outage due to lack of high availability.

Bonding between a pair of resources and/or users is measured on a scale of 0-1, with the value "1" denoting a critical dependence, or bond. Transitive dependencies are defined between three resources and/or users, such as R1, R2 and R3. For example, where the dependency of R1 on R2 is d12 and the dependency of R2 on R3 is d23, and $\alpha$ represents a weighting value where one interceding dependency is closer than the other interceding dependency. Where no weighting is desired, the value of $\alpha$ is simply the quotient of 1 divided by the number of interceding dependencies. To explain further, $\alpha$ denotes the weight of a dependency. As mentioned in the above example, α will have a higher value when the dependency is critical in the sense that if the linkage is broken, the system, application, and/or user cannot perform the intended function in the computing infrastructure. Accordingly, the transitive dependency of R1 on R3, where R1 is dependent on R2, and R2 is dependent on R3, is calculated as α12*d12+α23*d23, where α12+α23=1. Similar transitive dependencies are defined for any pair of resources connected together via a dependency chain.

The value of the DRF can be derived from one or more of the following factors, but not limited to these factors: (i) the number of interactions between two resources or a resource and a user in a cloud environment in a defined timeframe, i.e. frequency of interaction (DRF=>fn(freq)); (ii) the average duration of each interaction between resources and/or users (DRF=>fn(Avg Time of Interaction)); (iii) the amount of data exchanged between the resources and/or users (DRF=>fn (MB of Data exchanged)); and (iv) the recency of data exchanged between the resources and/or users (DRF=>fn(t), where the term "t" is the duration of the most recent data exchange between the resources and/or users in question.

Figure 5:
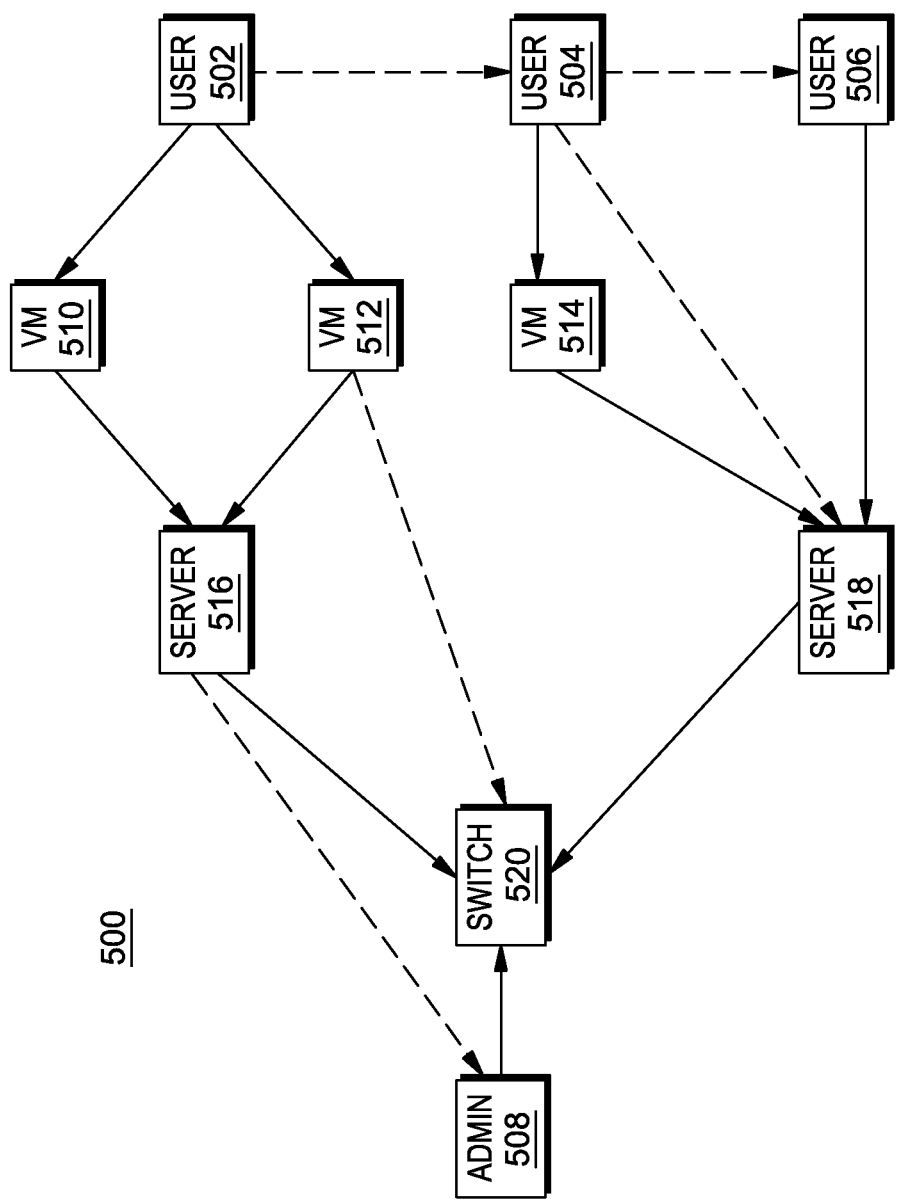
FIG. 5 is a schematic view of a second embodiment of a networked computers system according to an embodiment of the present disclosure.

FIG. 5 is a schematic view of sub-systems in cloud and computer network system 500 according to an embodiment of the present disclosure. System 500 includes: users 502, 504, and 506; network administrator 508; virtual machines 510, 512, 514; servers 516, 518; and switch 520. The communication lines shown in solid lines indicate tight couplings, or direct dependencies, and the dashed lines indicate transitive dependencies. It should be noted that for the network topology the user to user dependencies are all transitive dependencies because user activity is directed to the network interface and not to each other. That is, the user-user dependency is weighted as described above for transitive dependencies.

Dependencies with respect to dynamic usage relationships for resource and/or user pairs in system 500 will now be discussed. User 502 uses virtual machines 510 and 512 for her activities. Accordingly, the DRF value between user 502 and the two virtual machines is very high, such as 1, to indicate a critical dependence of the user on each of these resources. This tight coupling between user 502 and virtual machines 510 and 512 is shown in the figure as a solid line. Similarly, the virtual machines are each tightly coupled to server computer 516, also indicating a critical dependence.

Virtual machine 512 is shown as having a transitive dependency on network switch 520. Virtual machine 512 has a critical dependency on server 516 and server 516 has a critical dependency on the network switch, so virtual machine 512 has a transitive dependency on the network switch. This transitive dependency between virtual machine 512 and switch 520 described above is expressed mathematically as:

$$\alpha_{512\text{-}516} * d_{512\text{-}516} + \alpha_{516\text{-}520} d_{516\text{-}520},$$

where $\alpha_{512\text{-}516} + \alpha_{516\text{-}520} = 1$

Server 516 has a transitive dependency on network administrator 508, who operates the switch. The network administrator uses the switch in her activities, so there is a critical dependency between the administrator and the switch. If the administrator shuts down the switch, server 516, which is also dependent on the switch, is affected.

User 502 has a critical dependency on virtual machines 510 and 512. User 502 has a weak transitive dependency on the physical server 516. This transitive dependency on physical server 516, which is hosting the virtual machines, is weak because, in the event of server 516 failing, the virtual machines can be migrated to another host server. The weakness or strength of a dependency is understood by the weighting factor, "α," as discussed above. The actions of users 502 and 504 do not affect one another, so the user pair 502-504 has a DRF close to zero, indicating little to no dependence. For a large, distributed and interconnected computing environment, especially with virtual entities and corresponding dynamism (of migration, addition and removal of endpoints), there is a probability of transient or very remote dependencies on various endpoints and/or users which may not be very apparent.

User 504 has a transitive dependency on server 518. That is, user 504 uses virtual machine 514 for her activities, so there is a critical dependency between user 504 and virtual machine 514. Virtual machine 514 has a critical dependency on server 518. If server 518 is shut down, virtual machine 514 goes down and the activities of user 504 are impacted.

In this network topology, user 504 may be affected by actions taken by user 506 so, there is a transitive dependency between users 504 and 506. User 506 uses server 518 for her activities, so there is a critical dependency shown in the illustration.

Some embodiments of the present invention enhance the topology view of any cloud setup to depict how tightly or loosely resources and/or users are related to each other.

Some embodiments of the present invention use DRF to derive useful conclusions about a cloud setup including: (i) if a resource was to go down, which users and other resources would be affected in the cloud; (ii) how are various resources related directly or indirectly in a cloud eco-system; (iii) based on DRF, the placement of resources (physical and virtual) may be optimized (for example, two resources having a high (close to 1) DRF should be placed in the same subnet and the same geographic location to reduce network latency) (for another example, virtual resources, while migrating, should be migrated together for co-location if they have high (close to 1) DRF for each other).

Some embodiments of the present invention provide one or more of the following features, characteristics, and/or advantages: (i) a system and method to model topology and relationships between resources (physical and virtual) in a cloud, based on real time interaction among the resources and/or users; (ii) a system and method to model topology and relationships between users and resources (physical and virtual) in a cloud, based on real time interaction; (iii) a method to automatically recalculate resource-resource, user-user, and/or resource-user relationships in a cloud and/or data center when a resource or a user changes (roles, behaviors, and etc.) based on real time interaction between the resources and/or users in the network; (iv) a method to perform analytics in a cloud computing environment leveraging one or more features, characteristics, and/or advantages noted above, based on heuristics of interaction (in real-time) between resources and users.

Some embodiments of the present invention provide one or more of the following features, characteristics, and/or advantages: (i) a mechanism for modeling topology of cloud setup as per dynamic interaction relationships between resources in real-time; (ii) ensuring that the usage relationships of value to the user are always accurate and can be automatically retrieved on demand; (iii) easily integrated with any product that has a need to view the topology of a network from multiple perspectives; (iv) displaying a perspective of the computer network based on the combination of topology information from the network and relationships among the network's resources based on dynamic usage; and (v) using the interaction between the systems in a cloud and/or computer network to derive the interrelationship between them.

Some embodiments of the present invention derive relationships and the extent of bonding, or relative strength, using various factors which are typical in a cloud setup on which DRF is based (some of these could be used as inputs as well, to start off). These factors go beyond mere network packet sniffing (details in network packets). Some of these factors include: (i) virtualization (with its dynamic relationships, where the host-to-virtual machine relationship comes into play, along with migration); (ii) accounting for the quantum (frequency/volume) of data exchange; (iii) knowing the entities involved in data exchange; and/or (iv) knowing the nature, or characteristics, of data exchanged (such as data exchanged between SAN (storage area network) storage and servers or bulk data replication. For example, data exchanged between a server and a storage via a switch may appear to have a high dependency between server, switch, and storage based on network traffic; however, accounting for the fact that this is regular traffic between a server and a storage, which is most commonly configured through MPIO (multi-path I/O) configuration, the DRF would not attribute a high, or critical, dependency due to the specific factors of this case.

Virtual resources add another dimension of dynamicity in the relationships. For example, rather than just mapping the dynamic relationship between: (i) physical hosts; (ii) services; and/or (iii) applications, some embodiments also map the dynamic relationships of virtual resources including: (i) servers; (ii) virtual local area networks (VLANs); and/or (iii) storage pools. Some embodiments of the present invention include both physical and virtual resources in a network. In that way, connections are known for the entire network and how the network changes when one or more resources change within the network. One example of a network change is where a virtual server is migrated from one host to another. In some embodiments of the present invention, the virtual resource migration is recognized so that packets sent and/or received by this virtual resource are not missed in determining relationships.

Some embodiments of the present invention provide improved accuracy over deriving relationships based on just packets exchanged in a given time window by including data for: (i) recency of data exchanged; and (ii) frequency of data exchanged. For example, the actual data exchanged may be relatively low, but there are very frequent interactions between the resources and/or users.

While some embodiments of the present invention may be applied to: (i) resource interconnection information; (ii) problem determination; and/or (iii) maintenance mode impact, the accuracy of DFR permits some embodiments to optimize resource placement (both physical and virtual resources). For example, two resources having a high DRF (close to 1) may be placed in the same sub-net and/or geographic location to reduce network latency. For another example, virtual resources having a high DRF (close to 1), while migrating, may be migrated together for co-location.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B, "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine-readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, and application-specific integrated circuit (ASIC) based devices.

Usage resource relationship: the relationship among resources from the perspective of usage, that is, the characteristics of actual data communications between resources and/or users.

Network resource relationship: the relationship among network connected resources with respect to the volume of data exchanged, in actual data communication(s), between resources.

Virtual resource relationship: the relationship among virtual resources, including virtual machines, with respect to the volume of data exchanged, in actual data communication(s), between virtual resources and/or network resources.

Dynamic usage resource relationship: any usage resource relationship metric available within such a reasonable response time as to be considered real time availability.

Real time: includes any time frame of sufficiently short duration as to provide reasonable response time for information processing acceptable to a user of the subject matter described; in other words, any latencies are sufficiently short in duration such that a user would react substantially the same way as if there was no latency between a change, or event, and the presentation of the change, or event, to the user.

Computing environment: a computing environment will include multiple computing resources (called simply "resources") and may further include at least one human resource (called a "user," see definition, above); at least some of the data communications are made over a set of networks including at least one network.

Between: means among and/or between.

What is claimed is:

1. A computer program product comprising software stored on a non-transitory software storage device, the software comprising:
   first program instructions programmed to monitor data communications made between a plurality of resources in a computing environment;
   second program instructions programmed to generate usage data, based on the data communications, for a plurality of resources;
   third program instructions programmed to define a resource pair from the plurality of resources, the resource pair including a first resource and a second resource, the data communications including a communication between the first resource and the second resource;
   fourth program instructions programmed to determine resource relationship data including the usage data corresponding to the resource pair;
   fifth program instructions programmed to compute a measure of bonding between the first resource and the second resource based, at least in part, on recency of the communication between the first resource and the second resource;
   sixth program instructions programmed to generate a set of topology graph(s) based upon the measure of bonding between the first resource and the second resource; and
   seventh program instructions programmed to display the set of topology graph(s);
   wherein:
   the topology graph(s) indicate the measure of bonding between the pair of resources.

2. The computer program product of claim 1 wherein the measure of bonding between the resource pair is dynamically updated.

3. The computer program product of claim 1 wherein:
   the computing environment comprises a plurality of users; and
   the data communications further include data communications made between resources and users, and between users and users.

4. The computer program product of claim 1 wherein:
   computing the measure of bonding is additionally based upon a member of a group consisting of:
   volume of data communicated in data communication(s) in the pair; and
   frequency of communications in the pair.

5. The computer program product of claim 1 wherein:
   computing the measure of bonding is additionally based upon a member of a group consisting of:
   the entities involved in the data exchange; and
   the characteristics of data exchanged.

6. The computer program product of claim 1 wherein the plurality of resources in the computing environment includes a sub-system virtual machine.

7. The computer program product of claim 1, wherein:
   monitoring data communication occurs during a monitoring period; and
   the recency of communication is with respect to an end of the monitoring period.

8. The computer program product of claim 1 wherein the resource relationship data include transitive dependencies among resources and/or users.

9. A computer system comprising:
   a processor set; and
   a software storage device;
   wherein:
   the processor set is structured, located, connected and/or programmed to run software stored on the software storage device; and
   the software comprises:
      first program instructions programmed to monitor data communications made between a plurality of resources in a computing environment;
      second program instructions programmed to generate usage data, based on the data communications, for a plurality of resources;
      third program instructions programmed to define a resource pair from the plurality of resources, the resource pair including a first resource and a second resource, the data communications including a communication between the first resource and the second resource;
      fourth program instructions programmed to determine resource relationship data including the usage data corresponding to the resource pair;
      fifth program instructions programmed to compute a measure of bonding between the first resource and the second resource based, at least in part, on recency of the communication between the first resource and the second resource;
      sixth program instructions programmed to generate a set of topology graph(s) based upon the measure of bonding between the first resource and the second resource; and
      seventh program instructions programmed to display the set of topology graph(s);
      wherein:
      the topology graph(s) indicate the measure of bonding between the pair of resources.

10. The computer system of claim 9 wherein the measure of bonding between the resource pair is dynamically updated.

11. The computer system of claim 9 wherein:
    the computing environment comprises a plurality of users; and
    the data communications further include data communications made between resources and users, and between users and users.

12. The computer system of claim 9 wherein:
    computing the measure of bonding is additionally based upon a member of a group consisting of:
    volume of data communicated in data communication(s) in the pair; and
    frequency of communications in the pair.

13. The computer system of claim 9 wherein:
    computing the measure of bonding is additionally based upon a member of a group consisting of:
    the entities involved in the data exchange; and
    the characteristics of data exchanged.

14. The computer system of claim 9 wherein the plurality of resources in the computing environment includes a sub-system virtual machine.

15. The computer system of claim 9 wherein the resource relationship data includes transitive dependencies among resources and/or users.

16. The computer system of claim 9, wherein:
    monitoring data communication occurs during a monitoring period; and
    the recency of communication is with respect to an end of the monitoring period.

* * * * *